Patented Jan. 19, 1954

2,666,755

UNITED STATES PATENT OFFICE 2,666,755

VULCANIZABLE COMPOSITION

Laurence Baker, Akron, Ohio, assignor to The General Tire and Rubber Company, Akron, Ohio, a corporation of Ohio No Drawing. Application March 5, 1948, Serial No. 13,339

6 Claims. (Cl. 260—79.5)

This invention relates to a curable rubberlike composition and method of making the same. In particular the present invention relates to the vulcanization of "Butyl" rubber and similar materials which are copolymers of isobutylene and a polyolefine such as, for example, butadiene or isoprene and accelerators for the vulcanization of rubbers and such copolymers.

The so-called "Butyl" or G. R. I. types of rubbery polymers are prepared by copolymerizing at low temperatures a mixture of isobutylene and a diolefine in which the isobutylene preponderates. The diolefine is usually a conjugated diolefine such as butadiene and isoprene although conjugation of olefine groups is unnecessary. These rubbers have relatively low permeability to air and are the most desirable of the synthetic rubbers used for the preparation of inner tubes for pneumatic tires. Because of the low amount of chemical unsaturation they are difficult to vulcanize and require relatively large amounts of a fast curing type of organic accelerator to permit a reasonable curing or vulcanizing rate.

Prior to the present invention the most satisfactory accelerator for the vulcanization of these rubbery copolymers of isobutylene and a diolefine was tetramethyl thiuram disulfide. This material was generally used in amounts of around 1% in rubber mixes used in the preparation of inner tubes for pneumatic tires. Great difficulty has, however, always been experienced with these compounded mixes because of what was generally considered particles of dirt that were distributed in the stock. While the same particles in natural rubber stocks would probably not cause processing difficulty, they are accentuated in "Butyl" stocks. Blow holes and thin spots therefore, have a marked tendency to form during the inner tube curing operation and cause scrap or second-quality tubes. These difficulties have greatly restricted the acceptance of "Butyl" rubber as a main inner tube forming material.

I have found that many of the particles of dirt in these "Butyl" rubber compositions are particles of undispersed tetramethyl thiuram disulfide and that this accelerator is exceedingly difficult if not impossible, to disperse in "Butyl" rubber by mastication alone. I have also found that in accordance with the present invention the dispersion of tetramethyl thiuram disulfide can be markedly improved by mixing it, prior to its incorporation into the rubbery polymer with a relatively small proportion of the tetraethyl thiuram disulfide. This latter material like the tetramethyl thiuram disulfide material is a powder, but unlike the tetramethyl thiuram disulfide it heat softens readily at mixing temperatures. In fact, because of its oily nature at mixing temperatures, tetraethyl thiuram disulfide is difficult to incorporate in rubbery materials. Once incorporated, however, it disperses readily.

When about one part of the tetraethyl thiuram disulfide is premixed with about three parts of the tetramethyl thiuram disulfide, a composition which may have some similarity to a eutectic is apparently formed and this composition may be both readily milled into and readily dispersed into various rubbery compositions including those in which "Butyl" rubber is the main vulcanizable constituent. The previous troublesome "dirt" particles are eliminated and difficulties in the use of "Butyl" rubber stocks thus reduced.

As little as 5% or 10% of tetraethyl thiuram disulfide mixed with 95% of tetramethyl thiuram disulfide has a noticeable effect in dispersion of the latter. Mixtures in which the tetraethyl thiuram disulfide comprises about 20% to 35% of the mixtures are considerably superior to either one alone and superior to the mixtures containing larger or smaller proportions of the tetraethyl thiuram disulfide. As aforementioned, optimum properties are obtained when the ethyl derivative is about 25% to 30% of the composition. When the ethyl thiuram disulfide is more than 45% or 50%, the mixture becomes too oily and difficulty is had in incorporating it into the rubbery material.

The mixtures of the tetraethyl and tetramethyl thiuram disulfide may be prepared in any convenient way as by stirring the powdered materials together, grinding the compositions together, or even by chemically preparing the materials together, as by preparing the mixture directly from the mixed raw materials used for preparing each of the components. When the two materials are precipitated or crystallized together very slightly less of the ethyl derivative is sometimes preferred than when the powders are prepared by mechanically mixing them.

In the formation of vulcanizable rubberlike compositions from the mixed accelerator combinations of the present invention, any of the usual mixing procedures may be used, thus, the accelerator combinations may be masticated with the rubbery polymer such as a copolymer of isobutylene and a diolefine to form a relatively concentrated master batch and portions of the master batch later added to unaccelerated compounds for the preparation of inner tube stock. In an alternative method, a relatively small amount such as about 1%, generally between .5% and 2% (based on the weight of the rubbery copolymer)

may be milled or masticated directly into the rubbery polymer before, during or after the addition of the other compounding agents. In either event, a homogeneous dispersion is readily produced and difficulties due to the use of "Butyl" or G. R. I. type of rubber are eliminated. An oily rubber softener, premixed with the tetramethyl thiuram disulfide will also improve the dispersion of this material but not to anywhere near the extent had by the tetraethyl thiuram disulfide.

The following example in which the parts are by weight, illustrates the present invention:

*Example*

| | Parts |
|---|---|
| G. R. I. | 100 |
| Accelerator mixture [1] | 1 |
| 2-mercaptobenzothiazole | .5 |
| Sulfur | 1.5 |
| Zinc oxide | 5 |
| Softener (pine tar) | 2 to 3 |
| Carbon black—semi-reinforced | 40 |

[1] The above accelerator mixture is a mixture comprising 25% of tetraethyl thiuram disulfide and 75% of tetramethyl thiuram disulfide.

In preparing the above compound the M. B. T., zinc oxide, carbon black and softener are mixed into the G. R. I. as in usual practice. The accelerator mixture is added and the mixing continued for a few minutes. The resultant rubbery compound is passed through a tubing machine and formed into inner tubes which are cured for about 6 minutes at 313° F. The inner tubes have excellent quality and relatively high tensile strength.

In the preceding example G. R. I. rubber may be substituted by other rubbery polymers although the present invention is particularly adapted to the acceleration of "Butyl" rubber and the preparation of mixtures in which "Butyl" rubber or "G. R. I." constitute substantially the whole vulcanizable constituent. It is, however, applicable to natural rubber, copolymers of one or more conjugated diolefinic compounds of less than 8 carbon atoms with a copolymerizable monoolefinic compound, including the copolymer of butadiene and aryl olefinic compounds such as styrene, as well as other polymers and copolymers of butadiene, isoprene, cyanoprene, chloroprene, etc. Formation of vulcanizable compositions containing these materials is facilitated in each case.

In accordance with the provisions of the patent statutes, the principle of operation of the invention, together with the example now considered to represent one of the best embodiments thereof, have been described; but it is desired to have it understood that the example shown is only illustrative.

What I claim is:

1. A method of preparing a vulcanizable compound of a copolymer of isobutylene with a polymerizable diolefin of less than eight carbon atoms, which compound may be used for the preparation of molded rubber articles wherein tetramethyl thiuram disulfide is mixed with the rubbery copolymer, the step which comprises masticating said tetramethyl thiuram disulfide into said rubbery copolymer while simultaneously masticating tetraethyl thiuram disulfide into the rubbery copolymer whereby each of these disulfides is in contact with the other during the mixing step, the amount of said tetramethyl thiuram disulfide being 5% to 50% of the total of said disulfides.

2. A method of preparing vulcanizable compounds of a low temperature rubbery polymerizable product of a liquid comprising a member of the group consisting of polymerizable conjugated diolefins of less than 8 carbon atoms and chloroprene wherein a vulcanizing agent, and tetramethyl thiuram disulfide accelerator is mixed with said rubbery copolymer, a step which comprises masticating said tetramethyl thiuram disulfide into said copolymer while simultaneously masticating tetraethyl thiuram disulfide into the rubbery copolymer, whereby each of these disulfides is in contact with the other during the mixing step, the amount of said tetraethyl thiuram disulfide being 5 to 50% of the total of said disulfides.

3. A vulcanizable composition comprising a rubbery copolymer of isobutylene with a diolefine of less than eight carbon atoms containing a vulcanizing agent and tetraethyl thiuram disulfide and tetramethyl thiuram disulfide distributed therethrough, said tetraethyl thiuram disulfide being 20% to 35% of the total of said disulfides, and said composition being characterized by an absence of granules of undispersed tetramethyl thiuram disulfide.

4. A compounded copolymer of isobutylene with a conjugated diolefine of less than eight carbon atoms comprising a mixture of tetramethyl thiuram disulfide and tetraethyl thiuram disulfide, said tetraethyl thiuram disulfide being 20% to 35% of the total of said disulfides, and said composition being characterized by an absence of granules of undispersed tetramethyl thiuram disulfide.

5. A vulcanizable composition comprising a rubbery polymerization product of a liquid comprising a member of the group consisting of polymerizable conjugated diolefins of less than eight carbon atoms and chloroprene, containing a mixture of tetraethyl thiuram disulfide and tetramethyl thiuram disulfide, said tetraethyl thiuram disulfide being 20% to 35% of the total of said disulfides, and said composition being characterized by an absence of granules of undispersed tetramethyl thiuram disulfide.

6. A method of preparing rubber articles of a rubbery copolymer of isobutylene with a polymerizable diolefine of less than eight carbon atoms in which tetramethyl thiuram disulfide is mixed with the rubbery copolymer comprising the steps of mixing said tetramethyl thiuram disulfide into said copolymer while it is mixed with tetraethyl thiuram disulfide in amounts so that the tetraethyl thiuram disulfide is 20 per cent to 30 per cent by weight of the mixture of tetraethyl and tetramethyl thiuram disulfides, masticating the compound then formed and shaping and vulcanizing said compound.

LAURENCE BAKER.

References Cited in the file of this patent

UNITED STATES PATENTS

| Number | Name | Date |
|---|---|---|
| 2,058,246 | McCortney | Oct. 20, 1936 |
| 2,363,703 | Sparks | Nov. 28, 1944 |

FOREIGN PATENTS

| Number | Country | Date |
|---|---|---|
| 415,790 | Great Britain | Sept. 3, 1934 |